United States Patent [19]

Miller et al.

[11] 4,269,646
[45] May 26, 1981

[54] METHOD OF MAKING A BELTED TIRE

[75] Inventors: Rickie L. Miller, Houston, Tex.; Noel E. Walters, Tallmadge, Ohio

[73] Assignee: The Goodyear Tire & Rubber Company, Akron, Ohio

[21] Appl. No.: 2,521

[22] Filed: Jan. 11, 1979

Related U.S. Application Data

[63] Continuation-in-part of Ser. No. 782,214, Mar. 28, 1977, abandoned.

[51] Int. Cl.³ .................... B29H 17/14; B29H 17/26
[52] U.S. Cl. .......................... 156/128 N; 152/354 R; 156/133; 152/361 R
[58] Field of Search ............ 156/95, 96, 123, 126–129, 156/132, 133; 152/185, 209, 354, 361

[56] References Cited

U.S. PATENT DOCUMENTS

| | | | |
|---|---|---|---|
| 844,820 | 2/1907 | Marks | 156/128 |
| 1,678,211 | 7/1928 | Davidson | 152/361 |
| 2,996,098 | 8/1961 | Lyon | 152/361 |
| 3,218,209 | 11/1965 | Travers et al. | 156/123 |
| 3,464,873 | 2/1969 | Hawkinson | 156/96 |
| 3,964,949 | 6/1976 | Kent et al. | 156/123 |
| 4,092,196 | 5/1978 | Miller et al. | 156/96 |

FOREIGN PATENT DOCUMENTS 808824 2/1959 United Kingdom ............... 152/361

*Primary Examiner*—John E. Kittle
*Attorney, Agent, or Firm*—Frederick K. Lacher

[57] ABSTRACT

A method of making a belted tire by first molding and vulcanizing a tire casing which may include carcass plies, tire beads, sidewall and undertread stock. The cured tire casing is mounted on axially movable rings and inflated. The beads of the tire casing are positioned axially so that the tire casing will have substantially the same diameter at the centerplane as the diameter of the finished tire. A narrow, inextensible restrictor band is wrapped centrally around the outer periphery of the tire and adhered thereto by an adhesive. The band is narrow enough not to radically change the operational characteristics of the belt structure, but wide enough to restrict expansion of the portion of the tire casing at the centerplane beyond a desired diameter for receiving the belt structure and tread. The beads are then positioned axially so that the shoulder diameter of the inflated casing is sufficient to provide a surface with the desired contour for receiving the belt plies and tread. A belt structure composed of a plurality of belt plies, separate from the narrow band, is then wrapped around and stitched to the tire casing after which a tread is wrapped around the belt structure. The assembly of tire casing, restrictor band, belt structure, and tread is then placed in a mold where the unvulcanized components of the belt structure and tread are molded and vulcanized.

8 Claims, 4 Drawing Figures

METHOD OF MAKING A BELTED TIRE

This application is a continuation-in-part of copending U.S. Application Ser. No. 782,214 filed Mar. 28, 1977, now abandoned and relates generally, as indicated, to the production of belted tires, especially radial truck tires having a belt structure of metal reinforcing cords.

Briefly stated, the invention is directed to the molding and vulcanizing of a beltless tire casing, including carcass plies, tire beads, and preferably, undertread and sidewalls. The cured tire casing is inflated and the beads positioned axially to provide a diameter at the centerplane which is substantially the same as the diameter in the finished tire. A narrow, inextensible band is centrally wrapped around the peripheral surface of the tire casing and adhered thereto by an adhesive. The beads of the inflated casing are then axially positioned so that the shoulder diameter provides a transverse profile of the peripheral surface to receive the belts and tread. The belt structure, including a plurality of belt plies, is centrally wrapped around and stitched to the tire. A tread is then wrapped around the tire casing after which the total assembly is placed in a mold where the unvulcanized components of the belt structure and tread are vulcanized.

The technology employed in the invention is somewhat similar to that described in U.S. Pat. No. 4,092,197, dated May 30, 1978, on the retreading and rebuilding of a radial tire rather than in the formation of a new tire. The invention, as indicated above, also envisions the use of a precured tread in combination with an unvulcanized belt structure.

The following description of the invention will be better understood by having a reference to the annexed drawings wherein.

Figure 2:
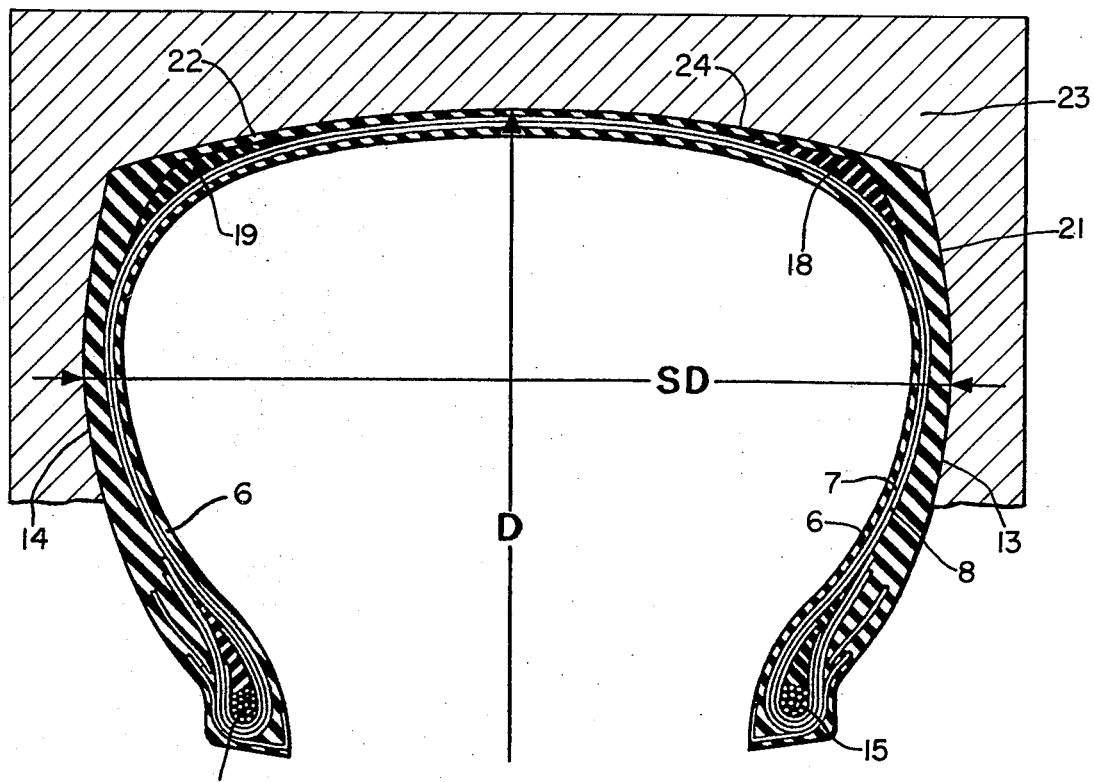
FIG. 2 is a section of a beltless radial tire casing and mold in which the casing is molded and vulcanized.
Figure 3:
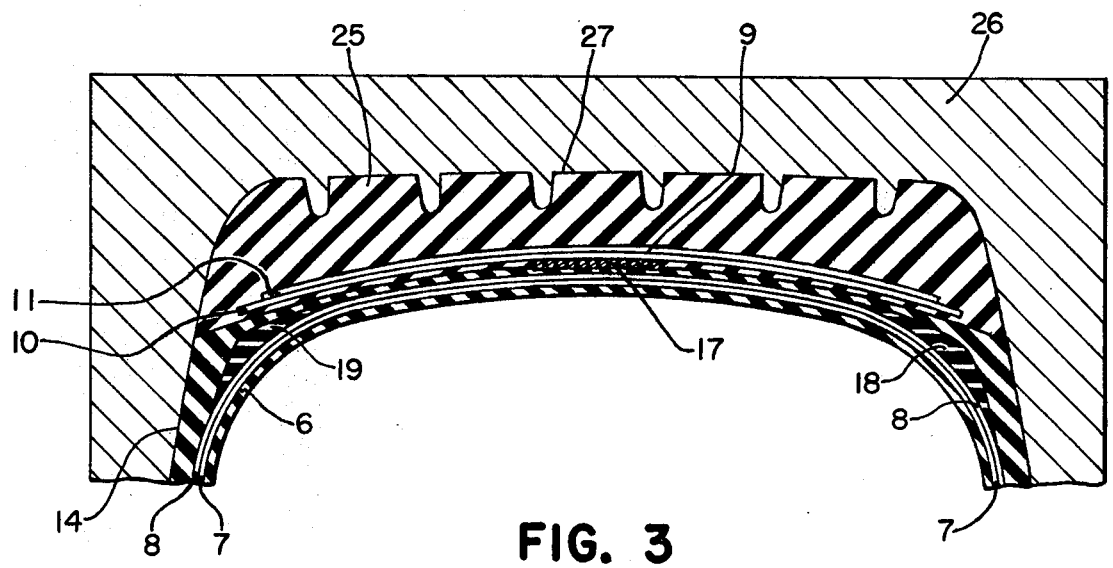
Figure 2A:
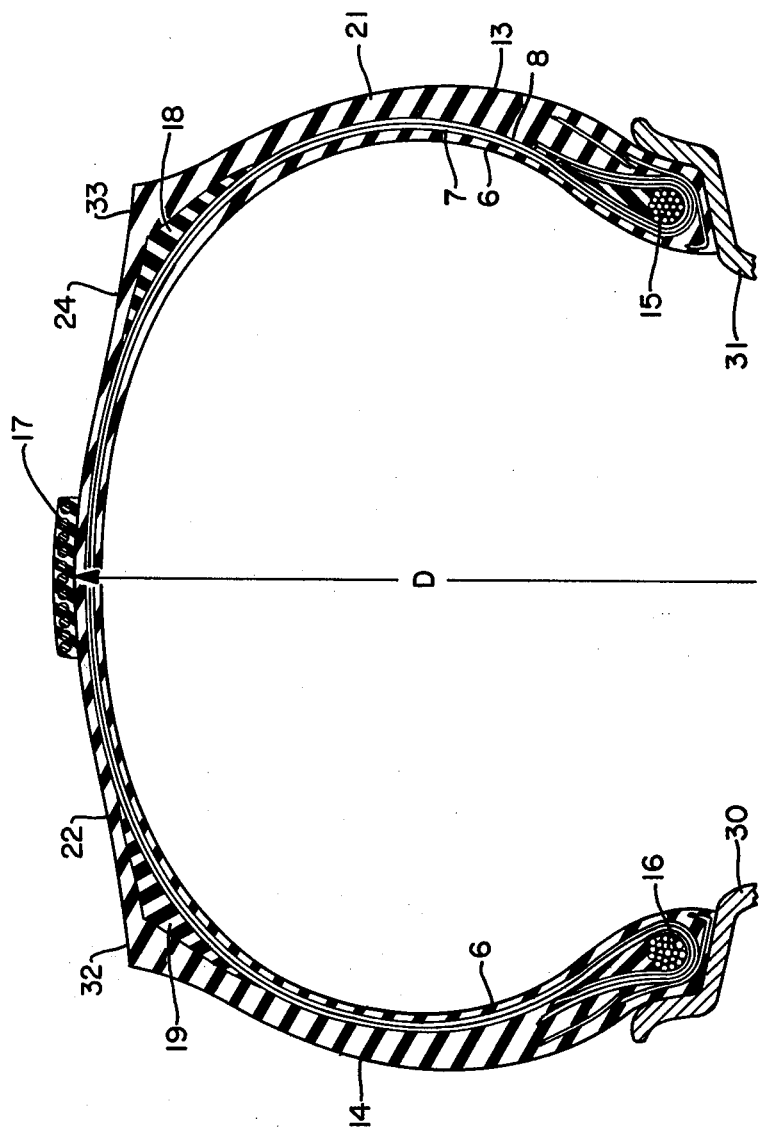

FIG. 2A is a section of the vulcanized beltless radial tire casing shown mounted on axially movable rings spaced to provide a predetermined diameter D at the centerplane with the restrictor band wrapped therearound; and FIG. 3 is a section of the upper portion of a radial tire, including the preformed casing, and mold in which the belt structure and tread are molded and vulcanized with the tire casing.

Figure 1:
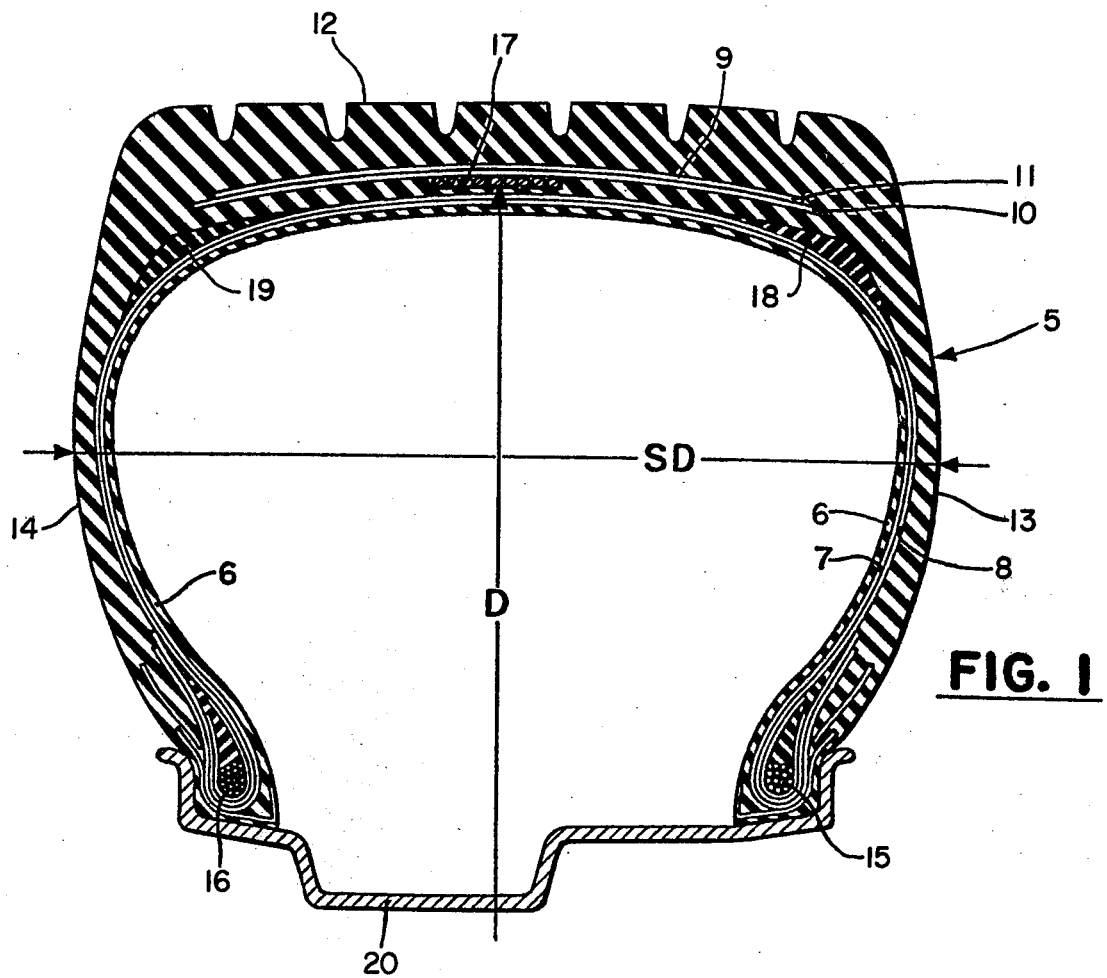
FIG. 1 is a section of a radial tire made in accordance with the invention.

With reference to FIG. 1 of the drawings, there is shown a belted tire such as radial tire 5 which is annular and in operation is rotatable about an axis. The tire 5 essentially comprises conventional components of an innerliner 6, a single or plurality of carcass plies 7,8 reinforced with radially oriented parallel cords of a suitable material such as rayon, nylon, polyester, aramid or steel, and a belt structure 9 for annularly reinforcing the radial tire. The belt structure 9 includes a plurality of belt plies 10,11 which are in superimposed relation and which are reinforced by parallel cords of a suitable material such as rayon, nylon, polyester, glass, aramid or steel. A tread 12 and a pair of sidewalls 13,14 surround the carcass plies 7,8 and terminate at a pair of substantially inextensible annular beads 15,16. A narrow, substantially inextensible restrictor band 17 is centrally disposed around the radial tire 5 intermediate the belt structure 9 and radially outermost carcass ply 8.

The belt plies 10,11, in the case of larger tires for trucks, for example, may be reinforced with parallel aramid or metal cords that are disposed at similar angles in the preferred range of from 15 to 80 degrees measured relative to a plane containing the midcircumferential centerline of the tread 12, when the tire is molded, vulcanized, and deflated, such plane hereinafter and in the claims referred to as the centerplane. The reinforcing cords of the successive belt plies 10,11 extend in different directions from the centerplane, but at similar angles, although in some cases the cord angle can vary from ply to ply. In the case of passenger tires, the cords of the belt plies 10,11 are disposed at angles in the preferred range of from 15 to 26 degrees relative to the centerplane. The reinforcing cords of the carcass plies 7,8 are radially oriented, i.e. disposed at angles in the range of from 75 to 90 degrees measured relative to the centerplane.

A pair of rubber wedges 18,19 may be provided to transversely flatten the peripheral surface of the tire 5 so that the belt structure 9 is in approximate cylindrical relation about the center axis of the radial tire 5. The radial tire 5 is shown mounted on a conventional wheel rim 20.

With reference to FIG. 2, there is shown a beltless, radial tire casing 21 which is utilized in the formation of the radial tire 5, as shown in FIG. 1. The tire casing 21 contains essentially all of the components of the radial tire 5 with the exception of the belt structure 9 and tread 12. The tire casing 21 can be made without the sidewalls 13,14 and an undertread 22. However, it has been found preferable to mold the tire casing 21 with these particular components. Thus, it can be appreciated that the radial tire 5, as shown in FIG. 2, is almost completely molded and vulcanized except for the belt structure 9 and tread 12.

The unvulcanized tire casing 21 may be conventionally built, as by the flat band method, after which it is placed in a conventional mold 23 where the tire casing 21 is shaped, molded and vulcanized. The outer peripheral surface 24 of the tire casing 21 can be molded smooth or with circumferential grooves which provide a mechanical interlock of the later applied tread 12 with the preformed tire casing 21. The overall diameter D at the centerplane of the tire casing 21 can be easily computed for any given tire. This information is necessary since it is important to restrict the tire casing 21 to this particular diameter D for receipt of the later applied unvulcanized belt structure 9 and tread 12 so that the overall diameter of the tire 5, prior to placing in the mold 23, will be essentially the same as the overall diameter of a similarly sized conventional tire prior to placing in a mold.

After the tire casing 21 is completely molded and vulcanized and removed from the mold 23, it is ready for receipt of the belt structure 9 and tread 12. As shown in FIG. 2A, the beads 15,16 of the preformed tire casing 21 may be mounted securely on axially movable rings 30,31. The tire casing 21 may then be shaped by inflation to a suitable pressure of around 4 to 8 pounds per square inch and axial movement of the rings 30,31 to a spaced-apart distance sufficient to provide the desired diameter D at the centerplane of the tire casing. The smooth outer peripheral surface 24 is preferably roughened slightly by buffing to enhance the adhesion of the band 17, belt structure 9 and tread 12 to the tire casing 21. A suitable adhesive is applied to the outer peripheral surface 24 and the restrictor band 17 is wrapped around the casing 21 at the centerplane and the ends lapped at least 3 to 4 inches. If desired, the restrictor band 17 may have a length equal to at least twice the circumference of the tire casing 21 at the centerplane. After application of the restrictor band 17, it may be stitched to the tire casing 21 in a manner well known in the tire building art.

The narrow restrictor band 17, as previously indicated, is designed so that it will restrict radial expansion of the tire casing 21 without adversely affecting the operational characteristics of the belt structure 9. It can be appreciated that the width of the restrictor band 17 naturally depends on the size of the radial tire 5. It is preferable to maintain the width of the restrictor band 17 in the range of from 5 to 15 percent of the section width SD of the tire 5. A one-inch wide restrictor band 17 was found especially suitable for a size 10:00-20 tire. The restrictor band 17 includes substantially inextensible cords of reinforcing material such as glass fibers, metal or aramid. The cords are parallel and extend longitudinally of the restrictor band 17. A smaller width restrictor band 17, e.g. one-half inch, can be spirally wound twice around the outer peripheral surface 24 of the tire casing 21 to form, for example, the one-inch wide restrictor band 17 used in the popular size tire indicated above. Thus, the restrictor band 17 can be made in a number of ways so long as it is kept narrow enough not to adversely affect the operational characteristics of the belt structure 9.

After the restrictor band 17 is stitched to the inflated tire casing 21, as shown in FIG. 2A, the rings 30,31 may be moved axially to reduce the distance between the beads 15,16 and further shape the tire casing 21 by expanding radially shoulders 32,33 of the tire casing to a predetermined diameter providing the relatively wide cylindrical outer peripheral surface 24 with the transverse contour shown in FIG. 2. The plies 10,11 of the belt structure 9 are then wrapped around and adhered to the outer peripheral surface 24 and may be stitched to the tire casing 21 by suitable stitching tools well known in the tire building art. The tread 12 may then be wrapped around the belt structure 9 in an open-end length slab with the ends butt spliced or in multiple-thread or ribbon form.

The belt structure 9 is always unvulcanized when applied to the tire casing 21 but the tread 12, although usually composed of unvulcanized rubber material, can be a previously molded and vulcanized tread in which case conventional adhesives are used to increase the bond between the preformed tread 12 and belt structure.

As best seen in FIG. 3, the assembly of a vulcanized tire casing 21, unvulcanized, partially vulcanized or vulcanized restrictor band 17, unvulcanized belt structure 9, and unvulcanized tread 12 are positioned within another mold 26 and heated so that the unvulcanized components are vulcanized with a pattern of ribs 25 and grooves molded into the outer surface 27 of the tread 12.

Thus, there has been provided a method of making a belted tire 5 of a preformed tire casing 21 to which is later added the belt structure 9 and tread 12.

While a certain representative embodiment and details have been shown for the purpose of illustrating the invention, it will be apparent to those skilled in the art that various changes and modifications may be made therein without departing from the spirit or scope of the invention.

What is claimed is:

1. A method of making an annular belted tire with a tire casing having a first predetermined diameter at the centerplane and a second predetermined diameter at the shoulders, said tire being rotatable about an axis of the tire and comprising:
   (a) building a beltless tire casing including
      (I) at least one carcass ply reinforced with cords, and
      (II) at least one pair of axially spaced substantially inextensible beads;
   (b) molding and vulcanizing said tire casing with a peripheral surface having a transverse contour with said first predetermined diameter at the centerplane and said second predetermined diameter at the shoulders;
   (c) mounting said beads on ring members movable axially to increase or decrease the distance between said rings;
   (d) shaping said casing by inflation of said casing and by axial movement of said ring members to provide said first predetermined diameter at the centerplane of said casing;
   (e) wrapping circumferentially around said outer peripheral surface a narrow, substantially inextensible restrictor band after said first predetermined diameter is obtained;
   (f) supporting said casing at least at said centerplane by applying a radially outward circumferentially distributed force through inflation of said casing sufficient for stitching said restrictor band on said casing;
   (g) further shaping said tire casing by continued inflation of said tire casing and axial movement of said ring members together to reduce the distance between said rings and radially expand the shoulders of said tire casing to said second predetermined diameter;
   (h) wrapping plies of an unvulcanized belt structure around said outer peripheral surface after said shoulders of said tire casing have been expanded to said second predetermined diameter of said shoulders;
   (i) wrapping an open-ended tread member around said belt structure; and
   (j) vulcanizing said belt structure and any other unvulcanized components of the assembly of said tire casing, belt structure and tread with said tire casing having said transverse contour.

2. The method of claim 1 wherein said restrictor band has a width measured transversely of said tire casing of from 5 to 15 percent the section width of said tire.

3. The method of claim 1 wherein said supporting of said casing is provided by a pressure of from 4 to 8 pounds per square inch within said casing.

4. The method of claim 1 wherein said vulcanizing of said belt structure and any other unvulcanized components of said assembly further comprises placing said assembly in a mold and heating the assembly in the mold.

5. The method of claim 1 wherein said carcass ply is reinforced with radially oriented cords.

6. The method of claim 1 wherein the ends of said restrictor band are lapped.

7. The method of claim 1 wherein the outer peripheral surface of said vulcanized tire casing is prepared for adherence of said restrictor band and said plies of said belt structure by buffing.

8. The method of claim 1 wherein said beads are removed from said ring members prior the step of vulcanizing said belt structure and any other unvulcanized components of said assembly.

* * * * *